United States Patent [19]

Martin

[11] Patent Number: 4,887,415
[45] Date of Patent: Dec. 19, 1989

[54] AUTOMATED LAWN MOWER OR FLOOR POLISHER

[76] Inventor: Robert L. Martin, 34 Woodside Dr., Belleville, Ill. 62223

[21] Appl. No.: 204,886

[22] Filed: Jun. 10, 1988

[51] Int. Cl.$^4$ .............................................. E21B 34/64
[52] U.S. Cl. ............................... 56/10.2; 56/DIG. 15; 180/131
[58] Field of Search ......................... 56/10.2, DIG. 15; 180/131, 140; 250/202

[56] References Cited

U.S. PATENT DOCUMENTS

| | | | |
|---|---|---|---|
| 3,425,197 | 2/1969 | Kita | 56/10.2 |
| 3,550,714 | 12/1970 | Bellinger | 180/79.1 |
| 3,570,227 | 3/1971 | Bellinger . | |
| 3,650,097 | 3/1972 | Nokes | 56/10.2 |
| 3,924,389 | 12/1975 | Kita | 56/10.2 |
| 4,180,964 | 1/1980 | Pansire | 56/10.2 |
| 4,184,559 | 1/1980 | Rass | 180/131 |
| 4,347,908 | 9/1982 | Anderson | 180/131 |
| 4,528,804 | 7/1985 | Williams | 56/10.2 |
| 4,573,547 | 3/1986 | Yoshimura et al. | 180/131 X |
| 4,603,753 | 8/1986 | Yoshimura et al. | 180/131 |
| 4,777,785 | 10/1988 | Rafaels | 56/10.2 |

*Primary Examiner*—William P. Neuder
*Attorney, Agent, or Firm*—Jerry T. Kearns

[57] ABSTRACT

An automated self propelled lawn mower utilizes a pair of drive motors for independently driving left and right hand drive wheels. Each drive motor is coupled to the respective drive wheel by a double output gear reduction unit. One side of the output shaft from each gear reduction unit is provided with a rotary photo encoder for providing speed and position information relating to each drive wheel. This information from each rotary photo encoder is fed to a computer control via a computer interface. Each independent wheel drive motor is computer controlled through an interface and motor drive relays. An infrared obstacle detector is mounted on each corner of the mower frame for detecting obstructions. Grass touch detection switches on the rear of the mower frame provide an indication of the relative position of the cut or uncut grass which is fed through the computer via the interface circuit for providing computer directional control to the independent wheel drive motors which steer the mower along the proper track. A separate blade drive motor is turned on or off by a photo switch which detects uncut grass. The speed of the blade drive motor is controlled by a manual switch. A floor polishing pad may be substituted for the lawn mower blade to enable use of the device as an automated floor polisher.

1 Claim, 5 Drawing Sheets

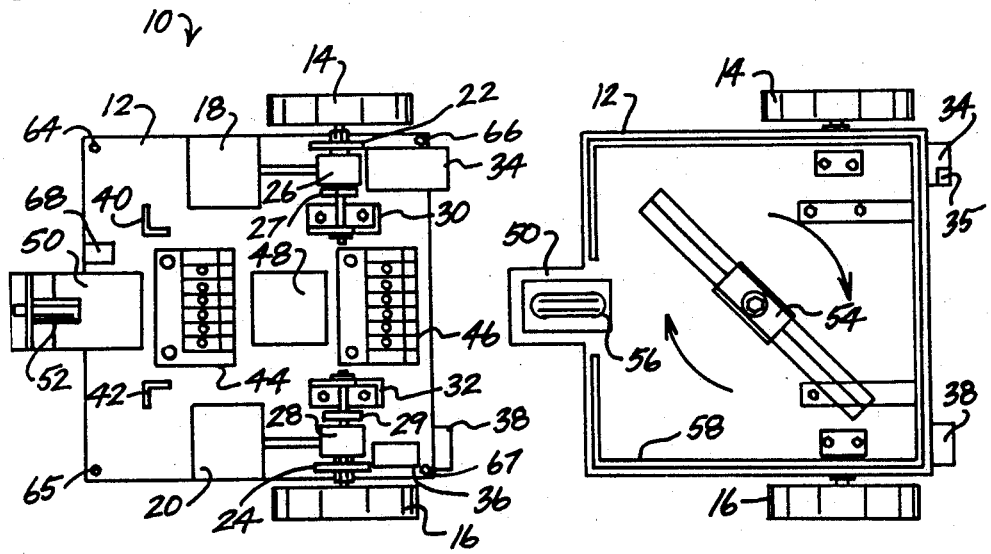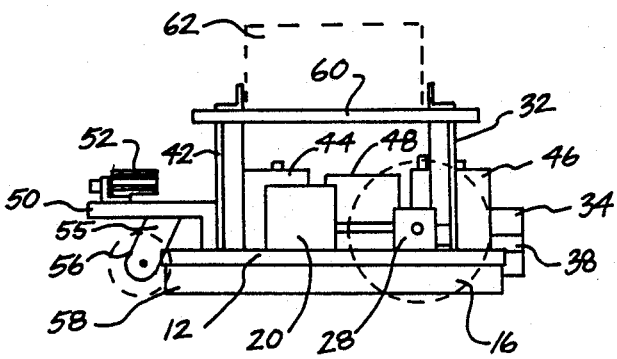

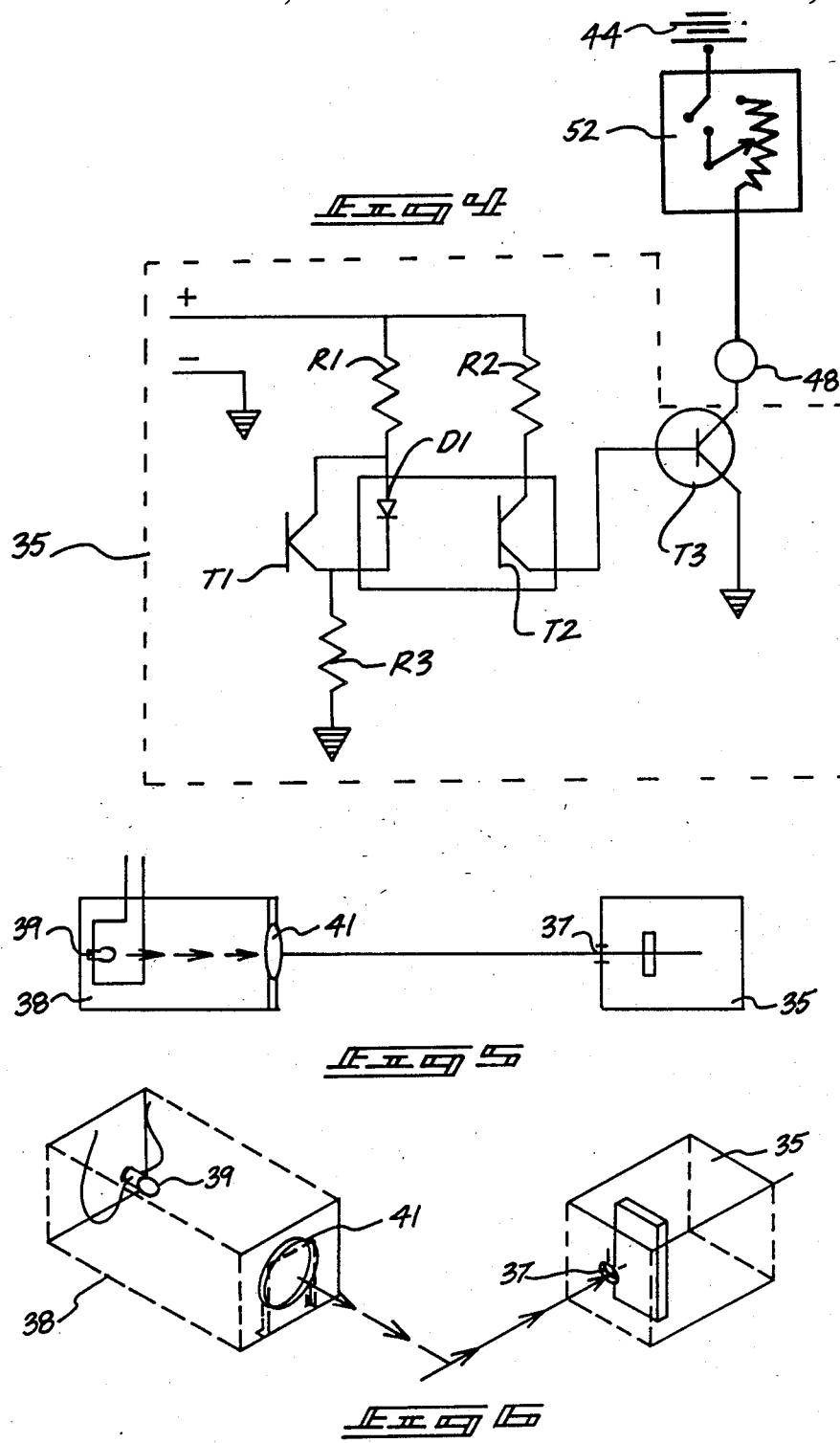

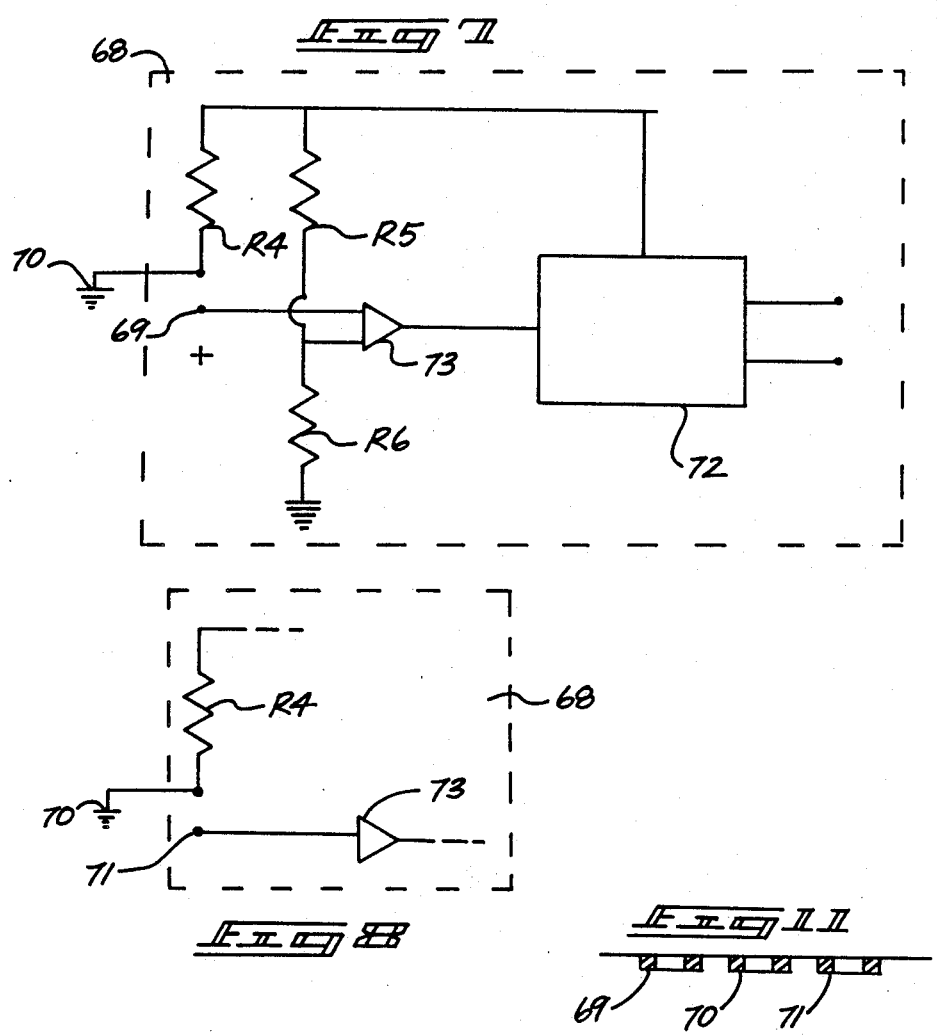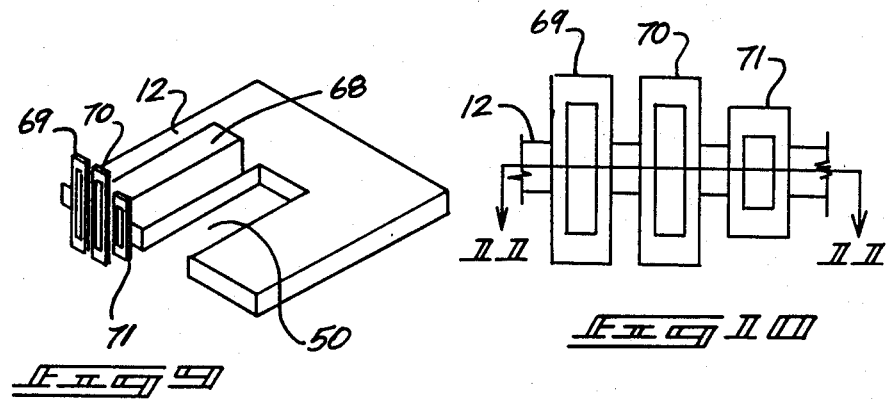

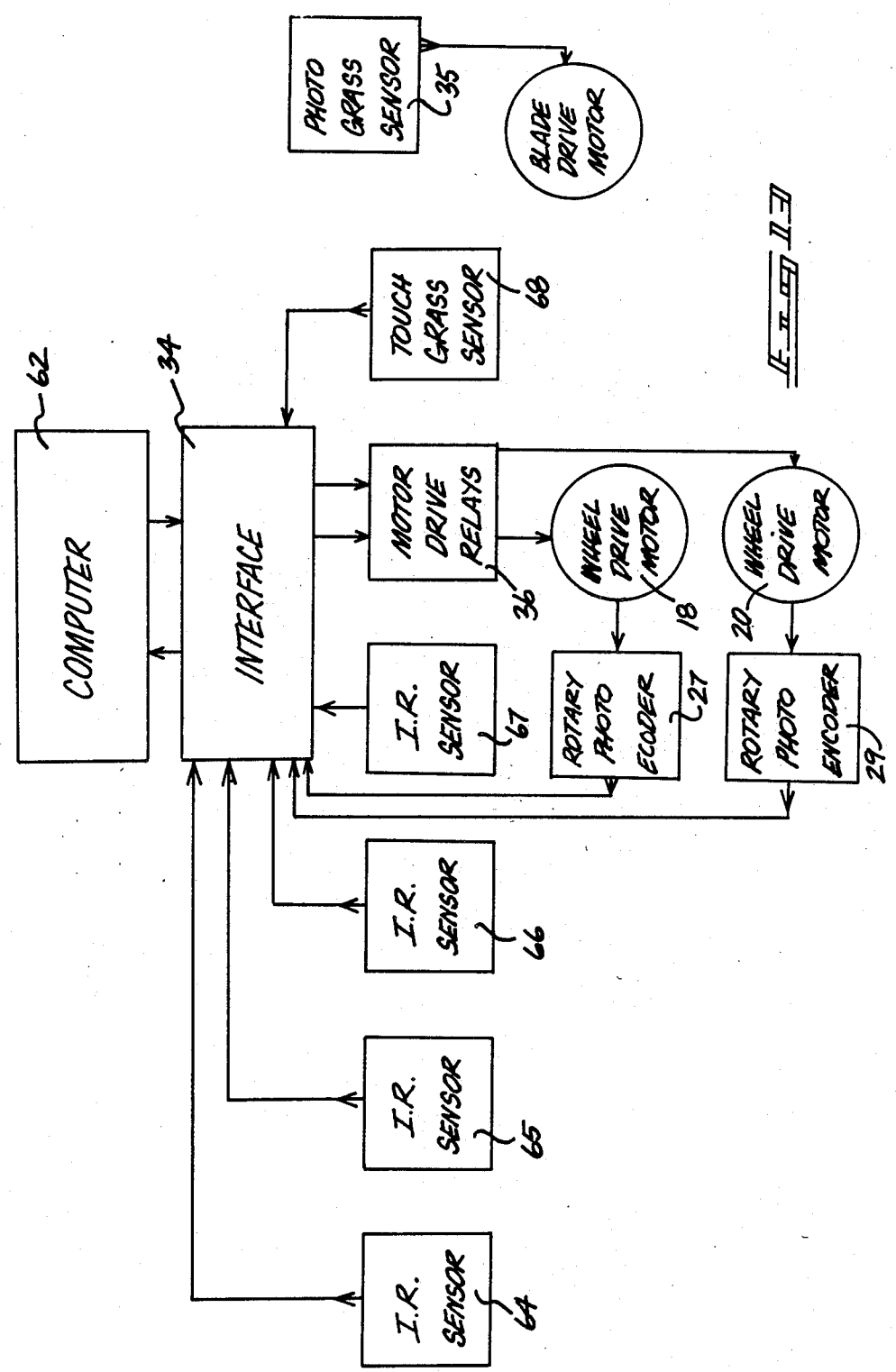

AUTOMATED LAWN MOWER OR FLOOR POLISHER

BACKGROUND OF THE INVENTION

1. Field of the Invention

The present invention relates to automated lawn mowers, and more particularly pertains to a new and improved automated lawn mower which utilizes obstacle sensors and touch grass sensors to control the direction of movement of a lawn mower through a computer interfaced feedback control of independent wheel drive motors. The conventional forms of automated lawn mowers heretofore devised require the setting of a boundary track or indicator around the plot of land to be mowed. Alternatively, the conventional forms of automated lawn mowers require a detailed precise programmed map of the plot of land to be mowed to enable the mower to follow a proper mowing course. In order to overcome the disadvantages of providing a programmed lawn plot map or constructing a boundary track indicator, the present invention provides an automated self propelled lawn mower which utilizes infrared obstacle detectors in conjunction with cut or uncut grass sensors to provide feedback control to independent wheel drive motors for steering the mower on a proper course.

2. Description of the Prior Art

Various types of automated lawn mowers are known in the prior art. A typical example of such an automated lawn mower is to be found in U.S. Pat. No. 3,550,714, which issued to S. Bellinger on Dec. 29, 1970. This patent discloses an automated self propelled mower which operates on the principle of random motion within a boundary. The boundary is established by a signal carried on a conductor which must be installed around the periphery of the plot of land to be mowed. The mower includes a sensor for receiving the boundary signal as the mower approaches the boundary and control circuitry for steering the mower away from the boundary. U.S. Pat. No. 3,570,227, which issued to S. Bellinger on Mar. 16, 1971, discloses a self propelled lawn mower for cutting grass in a random and unattended manner. The mower is propelled by a battery and comprises a frame supported on a pair of front castor wheels and a pair of rear drive wheels. The drive wheels are coupled to a continuously rotating drive shaft by individual clutch brake mechanisms. When a boundary wire installed around the perimeter of the plot of land to be mowed is sensed by coils on the frame, the drive wheel farthest away from the boundary is unclutched and braked to pivot or turn the mower. U.S. Pat. No. 3,650,097, which issued to C. Nokes on Mar. 21, 1972, discloses a self propelled lawn mower for movement over a given land area in a preplanned route. The mower has a frame and a steering mechanism with a tape extending between two reels with intermediate elements contacted sequentially by the tape for providing a programmed tape mechanical control of the course of the mower. U.S. Pat. No. 3,924,389, which issued to S. Kita on Dec. 9, 1975, discloses a lawn mower which utilizes a sensor mounted on the front of the mower to detect the edge of the swath by sensing the difference in height between uncut and cut grass in the swath. An electrical signal is produced by the sensors when it contacts the uncut grass and passes therethrough a minute electrical current. The current is amplified by a solid state amplifier circuit and fed to a pair of clutch brake assemblies for steering the mower along the edge of the swath. These clutch brake assemblies are connected for selectively braking and or driving the wheels of the mower. A sensor and control circuit design is disclosed for guiding the mower along the swath edge with a minimum of hunting even with grass is damp or growing sparsely. U.S. Pat. No. 4,184,559, which issued to H. Rass on Jan. 22, 1980, discloses a lawn mower with a mechanical sensor and piloting mechanisms which enable it to pilot itself along the edge line between the grass already cut and grass not yet cut, in a fairly straight course, and then to reverse its direction at the end of a run, move itself sideways, towards the uncut grass and proceed with another run. The lawn mower drive wheels are driven by a planetary gear mechanism which is coupled both to the motor and to rotatable sensor brushes mounted ahead of the drive wheels so that the planetary mechanism transmits power to the drive wheels only when the sensor brushes encounter resistance, such as from uncut grass, ahead of the drive wheels. The planetary gear mechanism is mounted on a guide frame that is pivotally mounted to the drive wheel frame so as to engage a first of two counter rotating gears linked on the wheel frame to the drive wheels. Forward impact against the guide frame causes it to pivotally rock so as to engage the second of the counter rotating gears to reverse direction of travel of the lawn mower. U.S. Pat. No. 4,347,908, which issued to R. Anderson on Sept. 7, 1982, discloses a self propelled lawn mower which is caused to traverse a plot of land to be mowed by following a line arranged over the land in a predetermined manner. A mechanical follower mechanism is provided on the lawn mower for following the course line. U.S. Pat. No. 4,528,804, which issued to T. Williams on Jul. 16, 1985, discloses a sensing unit for a row crop harvester guidance system which comprises a rotatably mounted crop engaging arm biased into a crop engaging position by a torsion spring. The spring tension is adjustable to vary the amount of force required to actuate the crop engaging arm. Variation of the force is desirable to permit the sensing unit to operate reliably in a variety of crop and field conditions. U.S. Pat. No. 4,603,753, which issued to S. Yoshimura et al on Aug. 5, 1986, discloses an automated lawn mower which utilizes a pair of spaced photo sensors for detecting the swath boundary between cut and uncut grass. Control circuitry actuated by these photo sensors operate electro-magnetic valves which operate hydraulic cylinders for steering the front and rear wheels of the mower.

While the above mentioned devices are suited for their intended usage, none of these devices provide an automated self propelled lawn mower which utilizes independent feedback controlled drive motors for independently driving the drive wheels of the lawn mower in accordance with information provided by touch grass sensors and infrared obstacles sensors. Inasmuch as the art is relatively crowded with respect to these various types of automated lawn mowers, it can be appreciated that there is a continuing need for and interest in improvements to such automated lawn mowers, and in this respect, the present invention addresses this need and interest.

SUMMARY OF THE INVENTION

In view of the foregoing disadvantages inherent in the known types of automated lawn mowers now present in the prior art, the present invention provides an improved automated lawn mower or floor polisher. As such, the general purpose of the present invention, which will be described subsequently in greater detail, is to provide a new and improved automated lawn mower or floor polisher which has all the advantages of the prior art automated lawn mowers and none of the disadvantages.

To attain this, a representative embodiment of the concepts of the present invention is illustrated in the drawings and makes use of a pair of drive motors for independently driving left and right hand drive wheels. Each drive motor is coupled to a respective drive wheel by a double output gear reduction unit. One side of the output shaft from each gear reduction unit is provided with a rotary photo encoder for providing speed and position information relating to each drive wheel. This information from each rotary photo encoder is fed to a computer control via a computer interface. Each independent wheel drive motor is computer controlled through an interface and motor drive relays. An infrared obstacle detector is mounted on each corner of the mower frame for detecting obstructions. Grass touch detection switches on the rear of the mower frame provide an indication of the relative position of the cut or uncut grass which is fed through the computer via the interface circuit for providing computer directional control to the independent wheel drive motors which steers the mower along the proper track. A separate blade drive motor is turned on or off by a photo switch which detects uncut grass. The speed of the blade drive motor is controlled by a manual switch. A floor polishing pad may be substituted for the lawn mower blade to enable use of the device as an automated floor polisher.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved automated lawn mower or floor polisher which has all the advantages of the prior art automated lawn mowers and none of the disadvantages.

It is another object of the present invention to provide a new and improved automated lawn mower or floor polisher which may be easily and efficiently manufactured and marketed.

It is a further object of the present invention to provide a new and improved automated lawn mower or floor polisher which is of a durable and reliable construction.

An even further object of the present invention is to provide a new and improved automated lawn mower or floor polisher which is susceptible of a low cost of manufacture with regard to both materials and labor, and which accordingly is then susceptible of low prices of sale to the consuming public, thereby making such automated lawn mowers economically available to the buying public.

Still yet another object of the present invention is to provide a new and improved automated lawn mower or floor polisher which provides in the apparatuses and methods of the prior art some of the advantages thereof, while simultaneously overcoming some of the disadvantages normally associated therewith.

Still another object of the present invention is to provide a new and improved automated lawn mower or floor polisher which utilizes a pair of drive wheels which are independently driven by feedback controlled wheel drive motors in response to information obtained from touch grass sensors and infrared obstacle detectors.

Yet another object of the present invention is to provide a new and improved automated lawn mower or floor polisher which utilizes a pair of drive wheels, each coupled to an independent drive motor by a double output gear reduction unit having a rotary photo encoder for indicating the speed and position of each drive wheel.

Even still another object of the present invention is to provide a new and improved automated lawn mower or floor polisher which provides touch grass detectors for determining the boundary between cut and uncut grass and utilizes infrared detectors for avoiding obstacles.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a top view of the automated lawn mower of the present invention.

FIG. 2 is a bottom view of the automated lawn mower of the present invention.

FIG. 3 is a side view of the automated lawn mower of the present invention.

FIG. 4 is a schematic diagram illustrating a photo switch control circuit for activating or deactivating the blade drive control motor of the lawn mower of the present invention.

FIG. 5 is a diagrammatic illustration of the manner of operation of the photo switch blade control of the present invention.

FIG. 6 is another diagrammatic illustration of the manner of operation of the blade control photo switch of the lawn mower of the present invention.

FIG. 7 is a schematic diagram illustrating the touch grass sensor switch of the automated lawn mower of the present invention.

FIG. 8 is a schematic diagram further illustrating the touch grass sensor switch of the automated lawn mower of the present invention.

FIG. 9 is a perspective view of a portion of the lawn mower frame, illustrating the mechanical assembly of the touch grass sensors of the automated lawn mower of the present invention.

FIG. 10 a front view of the touch grass sensors of FIG. 9.

FIG. 11 is a cross sectional view, taken along line 11—11 of FIG. 10, illustrating the touch grass sensors.

FIG. 13 is a block diagram illustrating the control circuits of the automated lawn mower of the present invention.

DESCRIPTION OF THE PREFERRED EMBODIMENT

Figure 12:
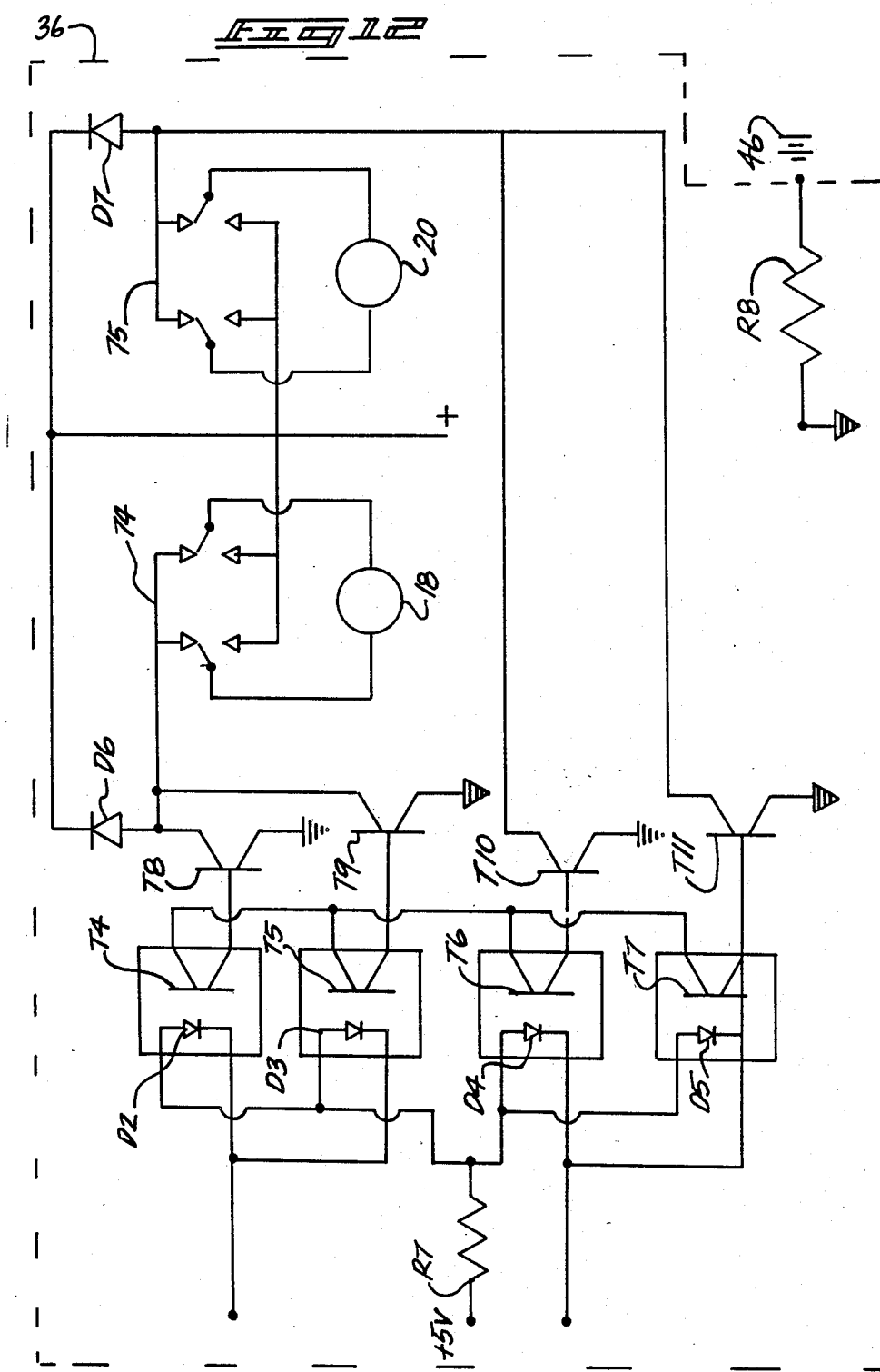
FIG. 12 is a schematic diagram illustrating the drive wheel motor relay control circuits of the automated lawn mower of the present invention.

With reference now to the drawings, and in particular to FIG. 1 thereof, a new and improved automated lawn mower or floor polisher embodying the principles and concepts of the present invention and generally designated by the reference numeral 10 will be described.

More specifically, it will be noted that the first embodiment 10 of the invention includes a generally rectangular frame base plate 12. A pair of ten inch diameter drive wheels 14 and 16 are mounted for rotation on opposite sides at a front portion of the frame 12. The drive wheels 14 and 16 are driven independently by wheel drive motors 18 and 20. The wheel drive motors 18 and 20 are variable speed DC motors; Dodge Omni radiator fan motors were utilized in the construction of a prototype. The drive wheels 14 and 16 are mounted for rotation with axles connected by clutches 22 and 24 to gear reduction units 26 and 28. The clutches 22 and 24 may be manually actuated shaft couplings. A ⅜ inch to ½ inch Black and Decker arbor was utilized in the construction of the prototype. The purpose of the clutches 22 and 24 is to enable the drive wheels 14 and 16 to be disconnected from the motors 18 and 20 to allow the mower to be operated by manual pushing. Various other conventional forms of manually actuated or electrically actuated clutches may be utilized without departing from the scope of the present invention. The gear reduction units 26 and 28 are Boston double output series 300, model number 310-50-H1 having a fifty to one gear reduction ratio. The second output shaft of each of the gear reduction units 26 and 28 is journalled for rotation in axle bearing blocks 30 and 32. A pair of rotary photo encoders 27 and 29 are provided on these output shafts for providing speed and position indications of the drive wheels 14 and 16 to a computer control unit. The rotary photo encoders 27 and 29 are of the type utilizing an infra red LED disposed in spaced relation to an FPT100 photo transistor. A circular disc is connected for rotation between the stationary LED and photo transistor, with the secondary output shaft of each of the gear reduction units 26 and 28. A circular array of spaced holes are formed in the disc, for allowing light to be transmitted from the LED to the photo transistor. This provides a series of pulses at a frequency dependent upon the speed of rotation of the drive wheels 14 and 16. The number of pulses may be counted by a computer control unit to provide an indication of the position of each drive wheel 14 and 16. A drive shaft extends vertically through a central portion of the frame 12 and is driven directly by a blade drive motor 48. A Dodge Omni radiator fan motor was utilized as the blade drive motor in the construction of a prototype. A manually actuated variable resistance switch 52 regulates the voltage supplied to the blade drive motor 48, thus providing a variable speed control. A pair of twelve volt batteries 44 and 46 are mounted on the upper surface of the frame 12. One of these batteries 44 is utilized to power the blade drive motor 48 and the other 46 is utilized to power the wheel drive motors 18 and 20. Four infrared obstacle detectors 64, 65, 66 and 67 are mounted at the corners of the upper surface of the frame 12. These infrared obstacle sensors may be of the type available from Mark V electronics designated as TY-401 MK III. They have a set range of one foot and each is tuned to a different lock frequency to prevent internal or external interference. A collimated LED source 38 is mounted on the front portion of the frame 12. The collimated LED source 38 cooperates with a photo switch mounted on the bottom of a computer interface housing 34. This photo switch serves to detect uncut grass at the front edge of the frame 12. If no uncut grass is detected, the battery 44 is disconnected from the blade drive motor 48. A touch grass sensor unit 68 is mounted adjacent the rear edge of the frame 12 for detecting the boundary between cut and uncut grass. These signals are fed to a computer control unit which controls the wheel drive motors 18 and 20 to steer the mower 10 on the proper course. A castor mount plate 50 extends from a central portion of the rear edge of the frame 12. A rear castor wheel extends downwardly from the castor mount plate 50 to support the rear portion of the mower 10. The castor mount plate 50 also provides a mounting surface for the blade motor speed control switch 52. The axle bearing blocks 30 and 32 also provide upstanding vertical supports for mounting a computer control unit. Additional upstanding vertical supports 40 and 42 are provided adjacent the rear edge of the frame 12. The interface 34 provides a five volt regulated power supply for the infrared detectors 64, 65, 66, 67, the rotary photo encoders 27, 29, the collimated LED source 38 and the associated photo switch.

In FIG. 2, a bottom view of the mower is provided. A rubber skirt 58 extends downwardly from the bottom peripheral edge of the frame 12 and serves to prevent rocks, grass, and other debris from being hurled outwardly by the mower blade 54. A castor 56 is mounted on the bottom surface of the castor mount plate 50. A photo switch 35, mounted on the bottom surface of the interface 34, cooperates with the collimated LED source 38 at the front edge of the mower 12 to provide an indication of cut or uncut grass.

In FIG. 3, a side view of the mower is provided. A mounting plate 60 is supported by the upstanding vertical supports 30, 32, 40 and 42. This mounting plate 60 serves to support a computer control unit 62. The computer control unit 62 may be a Radio Shack model 100. The computer interface 34 may be an Alpha products model AR135 A-bus which includes an MB-120 motherboard and an IN-141 digital input card. The castor 56 is mounted to the castor mounting plate 50 by a yoke 5.

FIG. 4 provides a schematic diagram of the grass detection photo switch 35. Light from the collimated LED source 38, when not obstructed by uncut grass, acuates the photo transistor T1 which energizes the diode D1. The diode D1 is a GaAs LED infrared emitter which dissipates 150 mW of power. The diode D1 has a peak forward current of 3.0 A during a 300 usec pulse and a continuous forward current of 80 mA. The diode D1 is optically coupled inside a light sealed DIP 4N33 package to an NPN Photo Darlington transistor T2. The transistor T2 is connected to an ECG251 switching transistor T3 which disconnects the ground lead of the blade drive motor 48 when energized, thus stopping blade rotation. The positive terminal of the blade drive motor 48 is connected by the variable resistor dimmer switch 52 to the battery 44. This enables the speed of the motor 48 to be manually adjusted in accordance with the grass density.

FIG. 5 provides a diagrammatic illustration of the operation of the photo grass detector. In the absence of uncut grass, light from the collimated LED source 38, which utilizes a single heterojunction GaAs Laser Diode 39 collimated by a reverse focused 20 mm wide angle projection lens 41, enters the photo switch housing 35 through a small aperture 37, striking the photo transistor T1 (FIG. 4).

FIG. 6 provides an isometric view illustrating the operation of the LED source 38 and photo switch 35.

FIG. 7 is a schematic diagram illustrating the construction of the grass touch sensor control circuit 68. Current conducted through moist grass between metallic conducting grass contact strips 69 and 70 is fed via the IC1A section of a dual LF353 JFET operational amplifier 73 to a TY-38 switch 72. The switch 72 contains an amplifier and a normally closed relay. The output of the switch 72 is connected to an input port of the interface 34.

As shown in FIG. 8, the second IC1A stage 73' of the dual LF353 JFET operational amplifier is connected to another metallic grass conducting strip 71.

With reference now to FIGS. 9–11, the operation of the grass touch switch 68 will now be described. Three metallic strips 69, 70 and 71 are secured to the rear edge of the frame plate 12. Each of the strips 69, 70 and 71 has a central slot for the reception of a screw utilized to attach the strips to the frame 12. The strips 69, 70 and 71 are electrically insulated from the frame 12 and from each other. The back surface of each strip which faces the edge of the frame 12 is provided with a non-stick paint finish to guard against false inputs by grass sticking to the strips. Strip 70 is a common ground and strips 69 and 71 are connected to separate inputs 73 and 73' of the operational amplifier. When the mower is on the proper course, the longer strips 69 and 70 are in contact with grass that is already cut (shorter grass), and the shorter strip 71 is in contact with uncut grass (longer grass). Thus, current is conducted through the moist grass to both inputs 73 and 73' of the grass touch switch control 68. When strip 69 is nonconducting (out of contact with grass), the mower will be steered alternately from left to right and right to left by computer control of the wheel drive motors 18 and 20. When strip 71 is nonconducting (over already cut grass), the mower will be steered to the right.

In FIG. 12, a schematic diagram illustrating the contents of the relay box 36 is provided. Inputs 1 and 2 are connected to output terminals of the interface 34. R8 is a self-variable nichrome resistor which serves as a ballast to prevent surge and transient high current damage to the power transistors T8, T9, T10, T11, caused by sudden high loads on the drive wheels 14 and 16. D6 and D7 are snap back diodes which prevent back EMF damage to the transistors. The two pairs of power transistors T8, T9 and T10, T11 and their corresponding opto-isolators T4, T5 and T6, T7 are wired in an "or" configuration to provide power boosting and signal feedback removal. Wheel drive motors 18 and 20 are independently actuated by two ten ampere contact double pole relays 74, 75. These relays 74, 75 may be of the type sold by Radio Shack as model number 275-218. Relays 74, 75 are independently actuated by control signals from the computer 62 through interface 34 to control the operation of the wheel drive motors 18 and 20. This independent control enables precise steering control of the mower by drive wheels 14, 16.

The following table lists the values of the various resistors, diodes and transistors of the schematic diagrams of FIGS. 4, 7, 8 and 12.

| RESISTOR | VALUE (ohms) | DIODE | TYPE | TRANSISTOR | TYPE |
| --- | --- | --- | --- | --- | --- |
| R1 | 56K | D1 | LED | T1 | FT100 Photo |
| R2 | 10K | D2 | LED | T2 | 4N33 |
| R3 | 10K | D3 | LED | T3 | ECG251 |
| R4 | 1K | D4 | LED | T4 | 4N33 |
| R5 | 47K | D5 | LED | T5 | 4N33 |
| R6 | 47K | D6 | 1N4001 | T6 | 4N33 |
| R7 | 100 | D7 | 1N4001 | T7 | 4N33 |
| R8 | 2 ohms nichrome self-variable | | | T8 | TIL101 |
| | | | | T9 | TIL101 |
| | | | | T10 | TIL101 |
| | | | | T11 | TIL101 |

In FIG. 13, a block diagram illustrates the control circuitry of the automated lawn mower of the present invention. The signals from the infrared obstacle sensors 64, 65, 66, and 67 are fed to the computer 62 through the interface 34. The touch grass sensor 68 detects the boundary between the cut and uncut grass and feeds these signals through the interface 34 to the computer 62. The computer 62 determines the steering signals to be fed to the wheel drive motors 18 and 20 through the motor drive relay 36. The motor drive relay 36 independently energizes the wheel drive motors 18 and 20 to steer the mower on the proper course. The speed and position of each drive wheel is determined by rotary photo encoders 27 and 29 and fed to the computer 62 through the interface 34. Thus, the wheel drive motors 18 and 20 are controlled by two separate feedback control loops. The photo grass sensor 35 at the front of the lawn mower determines whether the mower is approaching cut or uncut grass. If the sensor 35 does not detect uncut grass, the blade drive motor 48 is switched off.

While the invention has been described with reference to lawn mowing operations, by substituting a floor polishing pad for the blade 54, the device of the present invention may be utilized as an automated floor polisher. In this mode of operation, the touch grass sensors 68 and the photo grass sensor 35 are deactivated, and the steering is controlled by the infrared obstacle sensors 64, 65, 66 and 67.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the U.S. is as follows:

1. A new and improved automated lawn mower, comprising:

a frame having top and bottom surfaces;

a pair of drive wheels mounted for rotation on opposite sides of said frame, adjacent a front portion of said frame;

each of said wheels mounted for rotation with an axle;

each of said axles connected by a clutch to a gear reduction unit;

each of said gear reduction units having dual output shafts with one output shaft connected to said clutch;

a second output shaft of each of said gear reduction units mounted by a bearing block on said frame;

a rotary photo encoder on each of said second gear reduction output shafts;

a wheel drive motor connected to an input shaft of each of said gear reduction units;

a photo switch at a front edge of said frame for detecting uncut grass;

a vertically extending shaft extending through a central portion of said frame;

a variable speed blade drive motor on said upper frame surface connected to said vertically extending shaft;

switch means for manually regulating the speed of said blade drive motor;

a mower blade mounted for rotation with said vertically extending shaft beneath said frame;

a castor wheel centrally mounted adjacent a rear side of said frame;

a touch grass sensor formed from three metallic strips mounted on a rear side edge of said frame for detecting cut and uncut grass;

battery means operably connected for powering both of said wheel drive motors and said blade drive motor;

an infrared obstacle detector mounted at each corner on the upper surface of said frame;

control means operably connected for stopping said blade drive motor in response to said photo switch; and computer control means operably connected for independently controlling each of said wheel drive motors in accordance with signals received from said touch grass sensor, said rotary photo encoders and said infrared obstacle detectors for steering said motor along a boundary line between cut and uncut grass.

* * * * *